April 10, 1934.  C. E. ARMSTRONG  1,954,763
THERMOSTAT CONTROLS FOR HEATING PLANTS
Filed Sept. 20, 1932  4 Sheets-Sheet 1
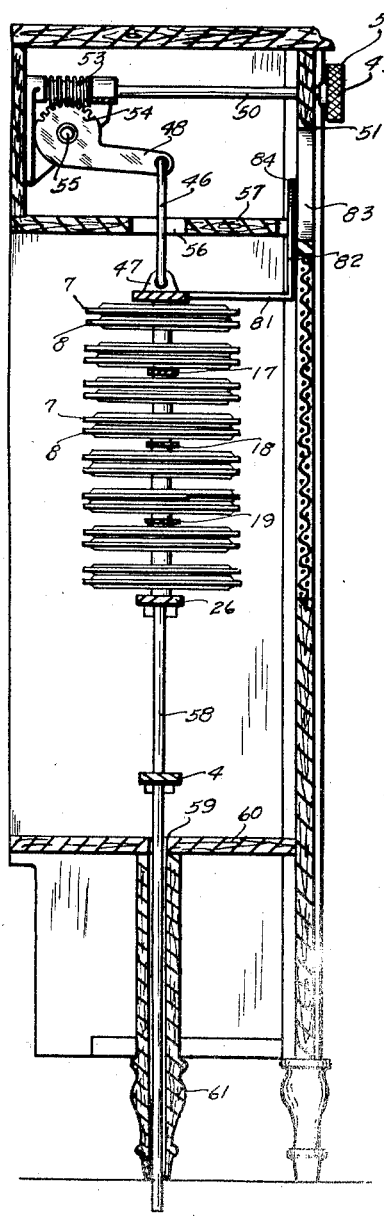
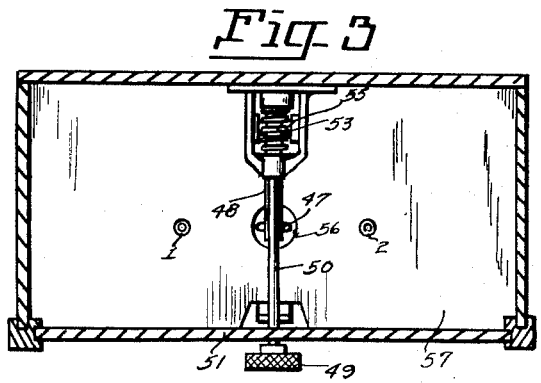
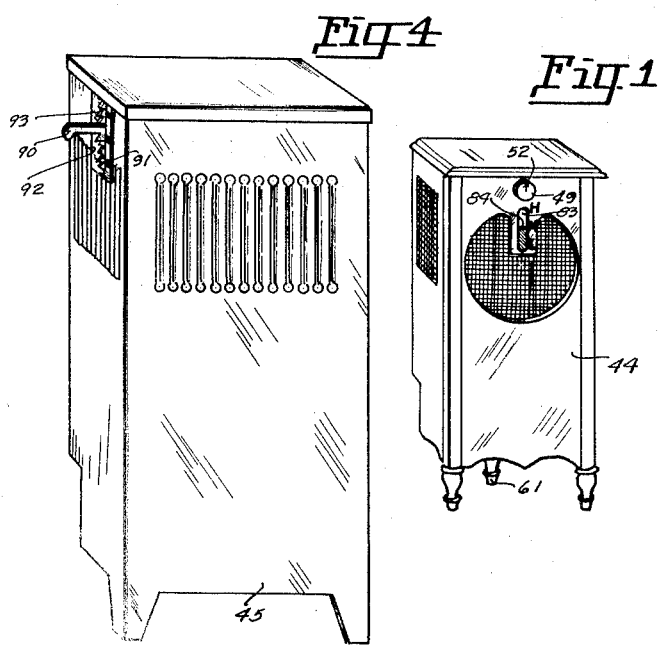
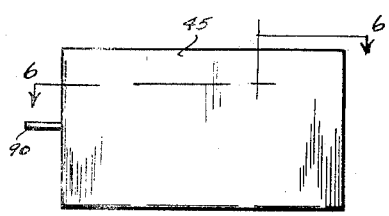
Inventor
Charles E. Armstrong
By
Attorney April 10, 1934. C. E. ARMSTRONG 1,954,763
THERMOSTAT CONTROLS FOR HEATING PLANTS
Filed Sept. 20, 1932 4 Sheets-Sheet 2
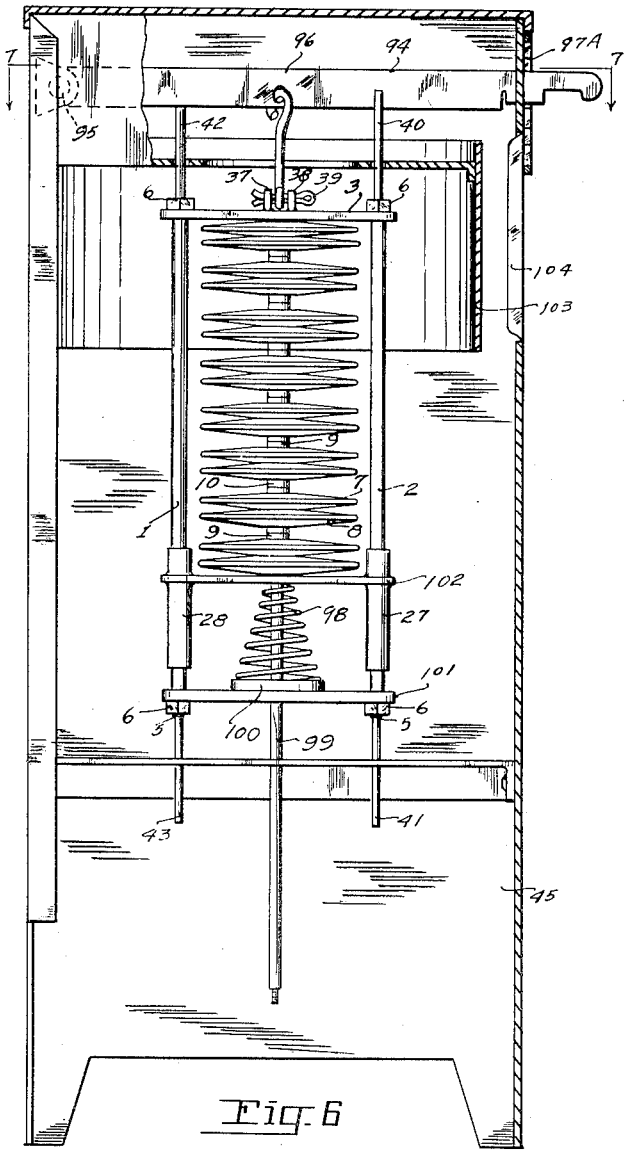
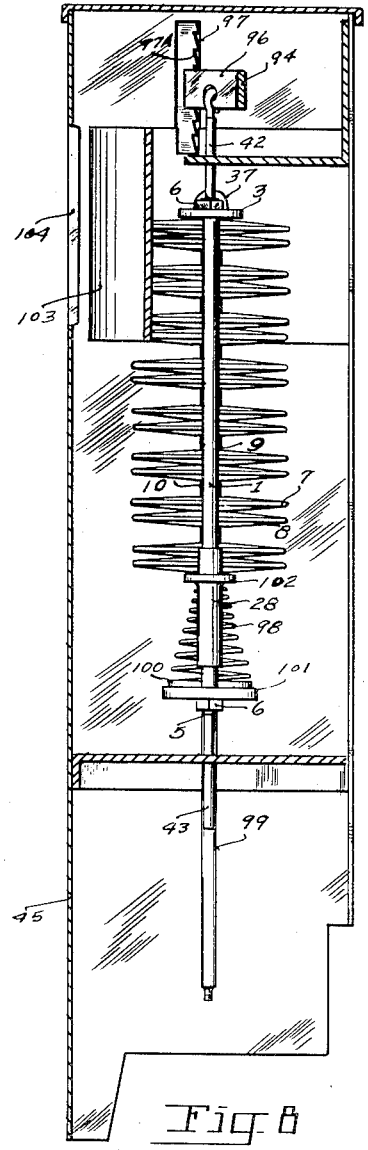
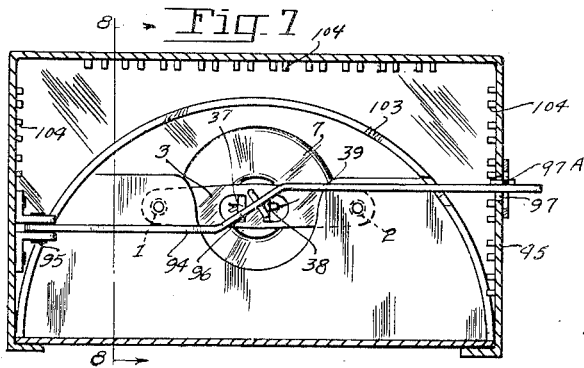
Charles E. Armstrong
Inventor
Attorney

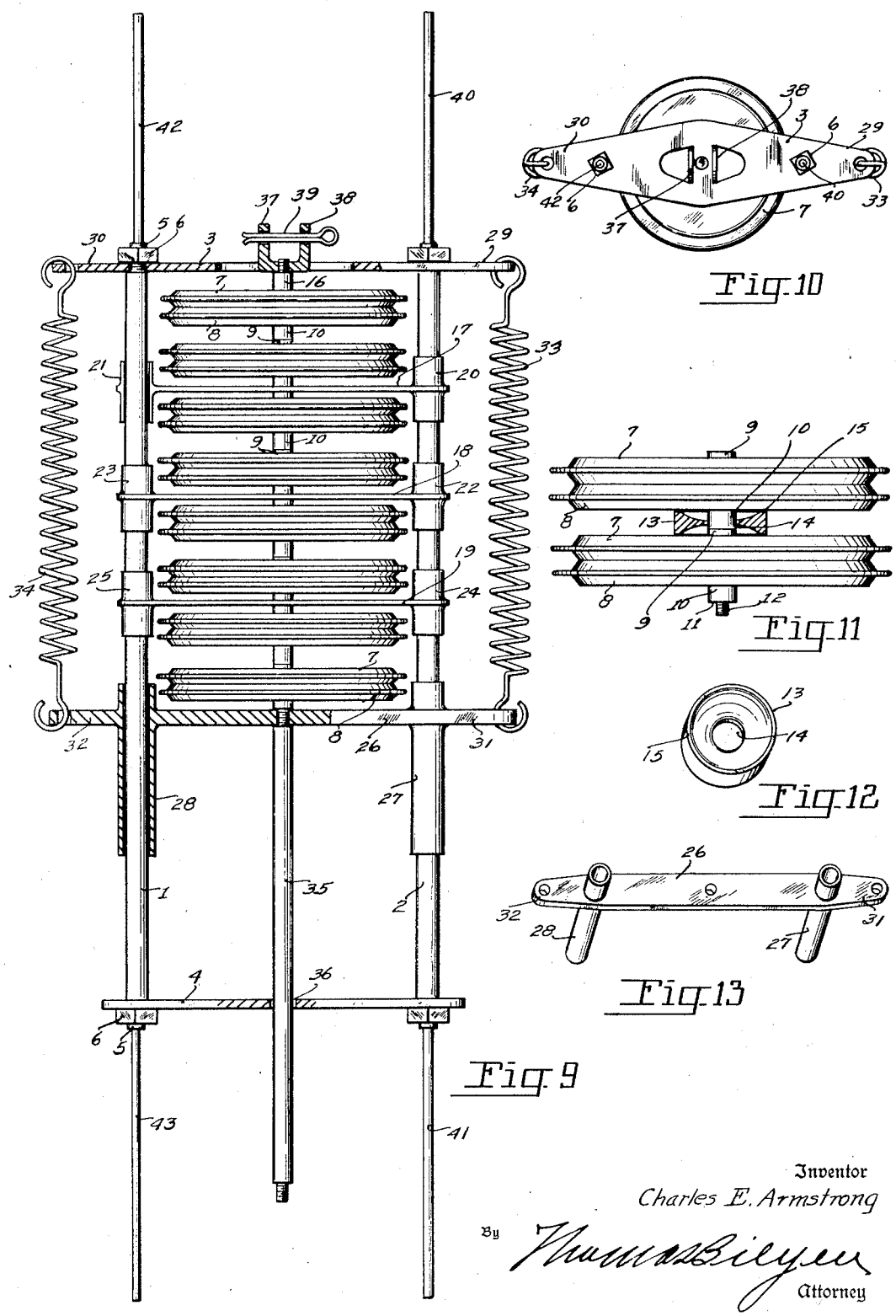

April 10, 1934.  C. E. ARMSTRONG  1,954,763
THERMOSTAT CONTROLS FOR HEATING PLANTS
Filed Sept. 20, 1932  4 Sheets-Sheet 4
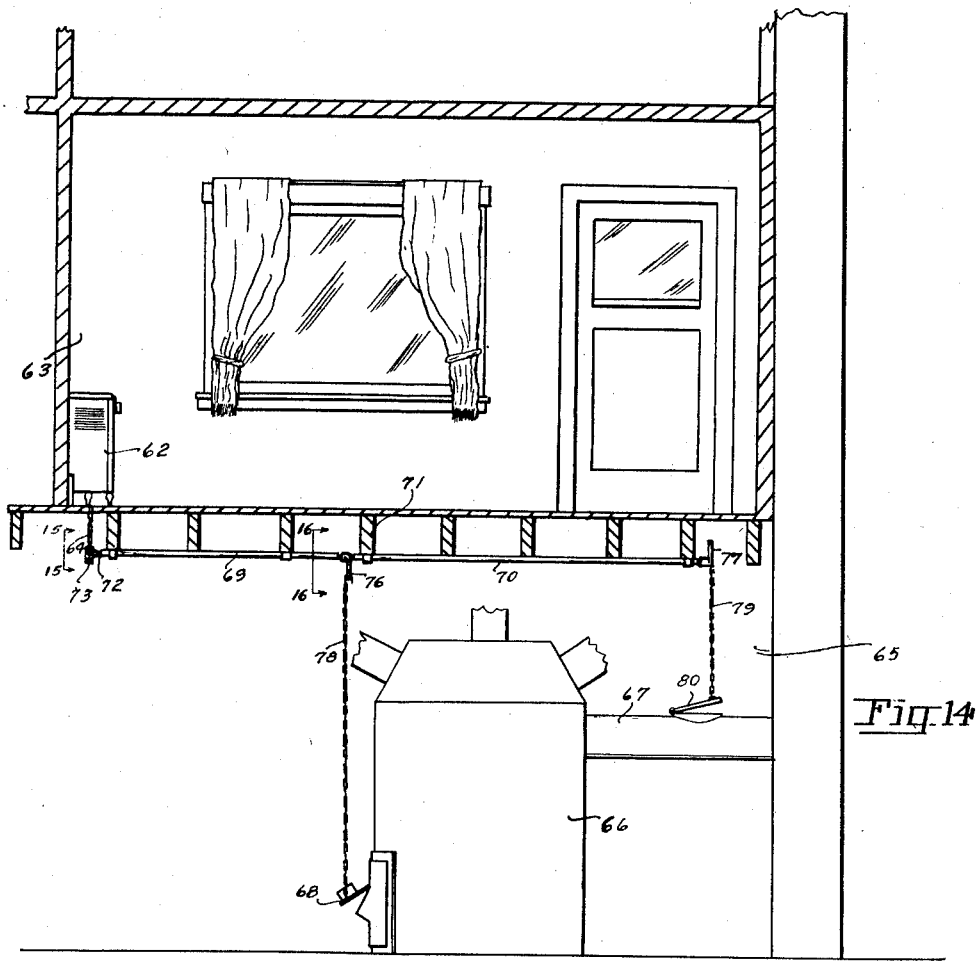
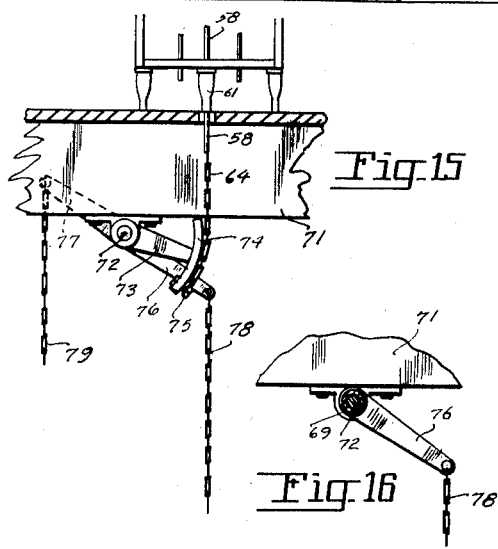
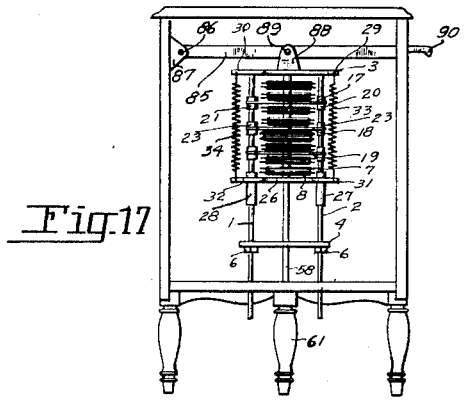
Charles E. Armstrong
Inventor Patented Apr. 10, 1934

1,954,763

UNITED STATES PATENT OFFICE 1,954,763

THERMOSTAT CONTROLS FOR HEATING PLANTS

Charles E. Armstrong, Corvallis, Oreg.

Application September 20, 1932, Serial No. 633,985

6 Claims. (Cl. 236—16)

My invention relates to automatic controls for the regulating of fuel to be supplied to a heating plant and for controlling the draft of a heating plant.

The invention is comprised primarily of wafers expansively secured together upon parallelly disposed spaced rods with cross members securing the same together.

A reacting element is associated therewith for normally maintaining the wafer under substantial compression. A threaded stem is associated with the assembly to which draft controls and fuel supply regulators may be directly or indirectly attached.

The assembly may be placed within the room or compartment or other place where the temperature is to be regulated.

A suitable cabinet mounting and closure is provided for the chassis assembly. Manually manipulative regulatory controls are provided to predetermine the range of temperature through which the device will go from "off" to "on" and contrariwise.

Heretofore, in devices of this type, it has been the general custom to provide controls that will operate electrically and to either shut the heat supply entirely off, or to open the supply completely so that a maximum amount of heat will be supplied periodically. This form of device has become the general and accepted standard where fluid fuels are being used as gas and oil fuels. My device may be used with equal facility, for regulating the amount of fuel consumed, and to predetermine within certain definite limits the rate of consumption of the fuel so that a definite amount of fuel will be consumed depending upon the temperature required and the condition of heat or cold that is prevailing.

The primary object of my invention is to provide automatic means for regulating the rate of flow of the fuel being consumed.

A further object of my invention is to provide automatic means for opening the dampers, and the draft controls to thereby regulate the rapidity of the burning of the fuel and to automatically predetermine the amount of heat that will be developed within a given time.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. 1 is a perspective, front view of the cabinet in which one of my new and improved assemblies is disposed.

Fig. 2 is a sectional, side view of the cabinet.

Fig. 3 is a top, plan view of the assembled device and of the cabinet, illustrating the top closure of the cabinet removed.

Fig. 4 is a perspective, front view of a cabinet of a modified construction.

Fig. 5 is a top plan view of the cabinet, as illustrated in Fig. 4.

Fig. 6 is a fragmentary, sectional rear view of the mechanism illustrated in Fig. 5, the same is taken on line 6—6 of Fig. 5, looking in the direction indicated.

Fig. 7 is a sectional, plan view of the mechanism illustrated in Fig. 6. The same is taken on line 7—7 of Fig. 6, looking in the direction indicated.

Fig. 8 is a sectional, side view of the mechanism illustrated in Fig. 7. The same is taken on line 8—8 of Fig. 7, looking in the direction indicated.

Fig. 9 is a fragmentary, sectional side view of the thermostat control chassis, illustrating the same removed from the cabinet.

Fig. 10 is a top, plan view of the mechanism illustrated in Fig. 9.

Fig. 11 is a sectional, side view of the two pairs of wafers illustrating the same expanded by a separator collar.

Fig. 12 is a perspective top plan view of one of the separator collars.

Fig. 13 is a perspective top plan view of the lower one of the cross bars and the guide bearings associated therewith.

Fig. 14 is a sectional, side view of a basement room and a room disposed thereabove, in which one of my new and improved devices is shown installed and adapted to a hard fuel heating plant disposed within the furnace, or basement room.

Fig. 15 is a fragmentary sectional, side view of the actuating lever arm to which is adapted a pull cord, or chain leading to the thermostat control. The same is taken on line 15—15 of Fig. 14, looking in the direction indicated.

Fig. 16 is a fragmentary, sectional end view of the control shaft and one of the arms adapted thereto and from which a chain pull leads to the furnace door. The same is taken on line 16—16 of Fig. 14, looking in the direction indicated.

Fig. 17 is a rear view of the cabinet illustrating a modified form of adjustment for predetermining the initial pressure within the expansion wafers.

Like reference characters refer to like parts throughout the several views.

The chassis of my thermostat control is primarily comprised of parallelly disposed spaced rods 1 and 2. The spaced rods each have shoulders disposed thereupon and adjacent there ends, and upon which parallelly disposed spaced cross bars 3 and 4 are disposed. Each of the rods is threaded adjacent, as illustrated at 5, in order that a clamping nut 6 may be threadably attached thereto. The nuts clamp the cross bar upon the rod and maintain the cross bar in tight working relationship with the shoulder of the rods.

Pairs of expansible wafers 7 and 8, are secured together. The wafers are filled with any suitable volatile substance, that expands and contracts at a suitable rate to meet the requirements of the service for which my new and improved thermostat control is to be used.

Each pair of wafers have stub shafts 9 and 10 outwardly extending from the oppositely disposed sides of the wafers. The axial center line of the wafer assembly comprises a common center line.

A shoulder 11 is disposed upon one of the stub shafts and a threaded end 12 terminates the same that adapts it for being threaded into the oppositely disposed stub shaft. The respective pairs of wafer units may be separated by a collar 13. The collar 13 has a hole 14 disposed centrally therethrough and through which the stub shaft passes. The collar is recessed upon its oppositely disposed sides to form a rim 15 at its outer edge and this rim only contacts the outer shell of the adjacent wafer units. The uppermost one of the stub shafts 16 may be secured to the cross bar 3, as by being threaded thereinto.

A plurality of spacer cross bars, here shown as three in number, at 17, 18 and 19, act as guide bars for the assembly of the wafers. Each cross bar carries a journal hub at each end, as shown at 20, 21, 22, 23, 24 and 25, upon their oppositely disposed ends, the journal hubs are sufficiently long to maintain the guide bars in parallel relation, as the expansion and contraction of the wafers causes a movement of the journal hubs longitudinally of the respective rods 1 and 2.

An end cross bar 26 is adapted to the rods and relatively long journal hubs 27 and 28 are disposed therefrom. The hubs are made to engage and have a longitudinal movement imparted thereto relative to that of the parallelly disposed rods 1 and 2. Each of the cross bars 3 and 26 have outwardly extending ends 29, 30, 31 and 32 that outwardly extend from the rods 1 and 2, and reacting elements, as coil springs 33 and 34 are secured to the respective ends. The springs are made sufficiently strong to maintain a substantial compression upon the respective wafer elements.

A stem 35 is threadably secured to the cross bar 26. The cross bar 4 and the cross bar 26 are spaced apart sufficiently to permit a free movement of the journal hubs 27 and 28 along the parallelly disposed bars 1 and 2, and the stem 35 passes through a hole 36 in the cross bar 4, which further maintains the assembly in working alignment.

A supporting yoke is disposed upon the cross bar 3. The supporting yoke may be formed by the punching of ears 37 and 38 from the cross bar 3, the ears being punched to permit a supporting pin 39 passing therethrough.

The rods 1 and 2 may have guide ends 40 and 41, 42 and 43 outwardly extending from the respective cross bars 3 and 4, to act as guide supports under certain classes of installations.

The assembly is preferably placed within any suitable cabinet. I have here shown two types of cabinets, as illustrated at 44 in Fig. 1, and at 45 in Fig. 4. These respective cabinets have screened openings disposed through their respective walls adjacent the thermostat assembly, to permit the free circulation of air therethrough.

Referring to Fig. 2, the thermostat assembly is placed within the cabinet, and a link 46 connects the yoke 47 with the head 48. The range of temperature to which my device is adapted for being actuated, may be predetermined and set by the placing of a knob 49 upon the shaft 50. The shaft 50 extends through the wall 51 of the cabinet and the knob 49 is secured to the outer end of the shaft 50. The knob preferably carries a pointer 52, that operates adjacent a graduated scale, to indicate the range of temperature through which the same is calibrated and set to indicate to the user the temperatures that will maintain in the operation of the device.

A worm 53 is disposed upon the shaft 50 and the worm 53 coacts with the segment of a worm wheel disposed upon the outer surface of the annular head 54 that is formed integral with the arm 48. The arm and head are journaled about any suitable journal shaft 55.

The rotating of the knob 49 predetermines the initial compression that is to be disposed within the respective wafers disposed within the assembly. The link 46 passes through an opening 56 disposed within a diaphragm 57 and a stem 58 passes through an opening 59 disposed within the bottom partition 60 of the cabinet. The stem 58 may also be passed through a leg 61 of the cabinet.

Referring to Figs. 14, 15 and 16, the cabinet 62 is placed within a room 63 and a chain 64 is secured to the lower end of the stem 58.

The room 63 is placed above the furnace room 65 and a hard fuel furnace 66 is disposed within the furnace room. A smoke pipe 67 leads from the furnace and a draft door 68 leads to the fire pot of the furnace.

Tubes 69 and 70 having a common center line are secured to any suitable joist supports 71 and a shaft 72 runs longitudinally of the tubes.

An arm 73 is secured to the shaft 72. A shoe 74 is disposed upon the outer end of the arm 73 and the chain 64 is secured thereto as by a fastening screw 75.

Arms 76 and 77 are also secured to the shaft 72 and a chain 78 connects the arm 76 with the draft door 68 and a chain 79 connects the arm 77 with a draft damper 80. With a drop in the temperature a pull is imparted to the stem 58, to the chain 64 and to the arm 73. A pull on the arm 73 imparts a partial rotation to the shaft 62. The arm 76, to which the chain 78 is attached actuates the draft regulator 68 and permits the increase of air to flow to the fire within the fire box of the furnace. Simultaneously therewith, the arm 77, which is disposed upon the opposite side of the shaft 72 is lowered and the damper 80 is closed. With a rise in temperature within the room the reverse operation occurs.

A bracket 81 may be carried by the yoke 47 and the up-turned end 82 of the bracket be set to move within, and in view of a window 83 disposed in the front of the cabinet.

The setting of the arm and head by the manual manipulation of the knob 49 positions the end 84 of the bracket into registerable alignment with the temperature desired as "high", "low", and "medium" temperatures.

An actuator, for positioning the relative position of the thermostat assembly within the cabinet may be made as illustrated in Fig. 17. When so made an actuator bar 85 may be hingedly secured relative to the cabinet. The bar is hinged about the hinge pin 86. The pin is positioned within a bracket 87 and is secured to the inside wall of the cabinet. The actuator bar is connected to the yoke 88 of the thermostat assembly through a connecting pin 89. The actuator lever terminates in a hand engaging end 90 that outwardly extends through the side wall of the cabinet and through a slit 91. A locking pawl 92 is associated with the actuating lever and the same is adapted to engage within the locking notches 93 disposed adjacent the slit 91.

A slightly modified form of my device may be made as illustrated in Fig. 7. When so made the actuator bar 94 is hingedly secured relative to the bracket about a hinge pin 95. The bar is offset at its center, as illustrated at 96 and passes through a slit 97 disposed within the side wall of the cabinet. The actuating arm is adapted for being fixedly and adjustably positioned within notches 97A.

In the primary description of the device I described the thermostat assembly as having a pair of reacting coil springs disposed at the opposite sides of the chassis. A single reacting element, as a conically shaped coil spring 98 may be disposed about the stem 99. The base end of the spring resting within a cup 100, that is disposed upon the end cross bar 101. The oppositely disposed end of the spring reacts against the movable cross bar 102. This form of construction limits the width of the construction over that heretofore described and makes possible a construction that is adapted for placement within limited areas.

Where the openings disposed within the walls of the cabinet are made relatively large, the thermostat assembly may be shielded from view by the placing of a shield 103 within the cabinet. The shield is placed between the inside walls of the cabinet and the thermostat assembly. Grilled openings 104 are disposed within the respective walls of the cabinet and adjacent the thermostat assembly. This shield may be made of any suitable light material that will shield off the thermostat assembly from view.

A free circulation of air is provided through the cabinet by leaving the lower end of the cabinet open and supporting the same upon legs to permit a free circulation of air upward through the base of the cabinet and out through the grillage disposed at the top of the side walls of the cabinet. This permits the maintaining of the temperature within the cabinet substantially that of the room temperature.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:

1. In a device of the class described, in combination with a cabinet, of parallelly disposed spaced rods, shoulders spaced apart from the ends of the rods and disposed upon each of the rods, a thread disposed upon the rods adjacent the shoulders, spaced cross bars disposed upon the rods and adapted for being fixedly positioned relative to the shoulders of the rods by clamping nuts, a plurality of pairs of expansible wafers each pair being threadably secured to the adjacent pairs, journal hubs spaced apart and slidably disposed upon the parallelly disposed spaced rods, spacer cross bars secured to the hubs and to the central threaded stem of the pairs of expansible wafers, an end cross bar slidably disposed upon the respective spaced rods and hubs disposed thereupon that are slidably disposed upon the spaced rods, coil springs secured to the end cross bar and the spaced cross bars and adapted for maintaining an initial compression with the respective expansible wafers, a threaded stem threadably secured to the end cross bar, a chain secured to the threaded stem, a shaft, a plurality of manipulative arms secured to the shaft, said manipulative arms disposed upon the oppositely disposed sides of the shaft and an actuating arm secured to the shaft, a shoe disposed upon the arm and means for securing the pull chain to the arm.

2. In a device of the class described, in combination with a cabinet, of spaced rods, spaced cross bars removably secured to the rods and adapted for maintaining the rods parallelly spaced apart, pairs of expansible wafers removably secured together and secured to one of the spaced cross bars and disposed longitudinally of and between the respective spaced rods, an end cross bar adapted for slidable engagement with the spaced rods and for being secured to the central stem of the compressible wafers, means for normally maintaining the compressible wafers under compression, a stem secured to the end of the movable cross bar and outwardly extending therefrom, a chain secured to the stem and to the arm, a shaft associated with the arm, and means for predetermining the position of the compressible wafer assembly support.

3. In a device of the class described, in combination with a cabinet, and a heating plant having a fire door and a damper, of a chassis, a thermostat disposed upon the chassis, the thermostat being comprised of a plurality of pairs of expansible wafers, means for normally maintaining the expansible wafer assembly under compression, an adjustable support for the chassis, said support being adapted for positioning the chassis, a chain carried by the expansible wafer assembly, said chain being secured upon its free end to an arm, the arm being adapted to a shaft and for partially rotating the shaft as the wafer assembly expands and contracts, arms secured to the oppositely disposed sides of the shaft, and a chain leading from one of the arms to the draft door of the furnace, and a chain secured to the other of the arms being secured on its other end to the draft damper of the furnace.

4. In a device of the class described, in combination with a cabinet and a heating plant, the cabinet being remotely disposed from the heating plant, the said heating plant having a fire door and a damper door, a chassis adjustably mounted within the cabinet, a thermostat comprising expansible and contractible wafers mounted within the chassis, means for normally maintaining the wafers under compression, a shaft, an arm secured to the shaft, a connecting chain disposed between the free end of the thermostat wafer assembly and the arm, and arms outwardly extend from either side of the shaft, and one of said arms being indirectly secured to the fire door, and the other one of the arms being indirectly secured to the draft control door of the heating plant.

5. In a device of the class described, in combination with the cabinet of a thermostat comprised of expansible and contractable wafers, an arm having a worm gear segment disposed upon one side hingedly secured relative to the cabinet, a worm and shaft adapted for coacting with the worm wheel disposed upon the arm, a hand knob for turning the shaft, a graduated bracket carried by the thermostat and the arm being adjustably positioned relative to a window disposed in one side of the cabinet, a link connecting the thermostat assembly with the arm, and a stem downwardly extending from the thermostat and extending longitudinally of and through one of the legs of the cabinet.

6. In a device of the class described, the combination of a supporting structure, a wafer thermostat operatively mounted within the supporting structure, an arm pivotally mounted at one of its ends to the supporting structure and extending across one end of the thermostat, said arm being adjustably engagable with the supporting structure and adapted to selectively regulate the action of the thermostat, a stem extending downwardly from the thermostat and adapted to be actuated by the thermostat, and means interconnecting the stem with a door adapted to be actuated by said thermostat.

CHARLES E. ARMSTRONG.